United States Patent Office 3,352,137
Patented Nov. 14, 1967

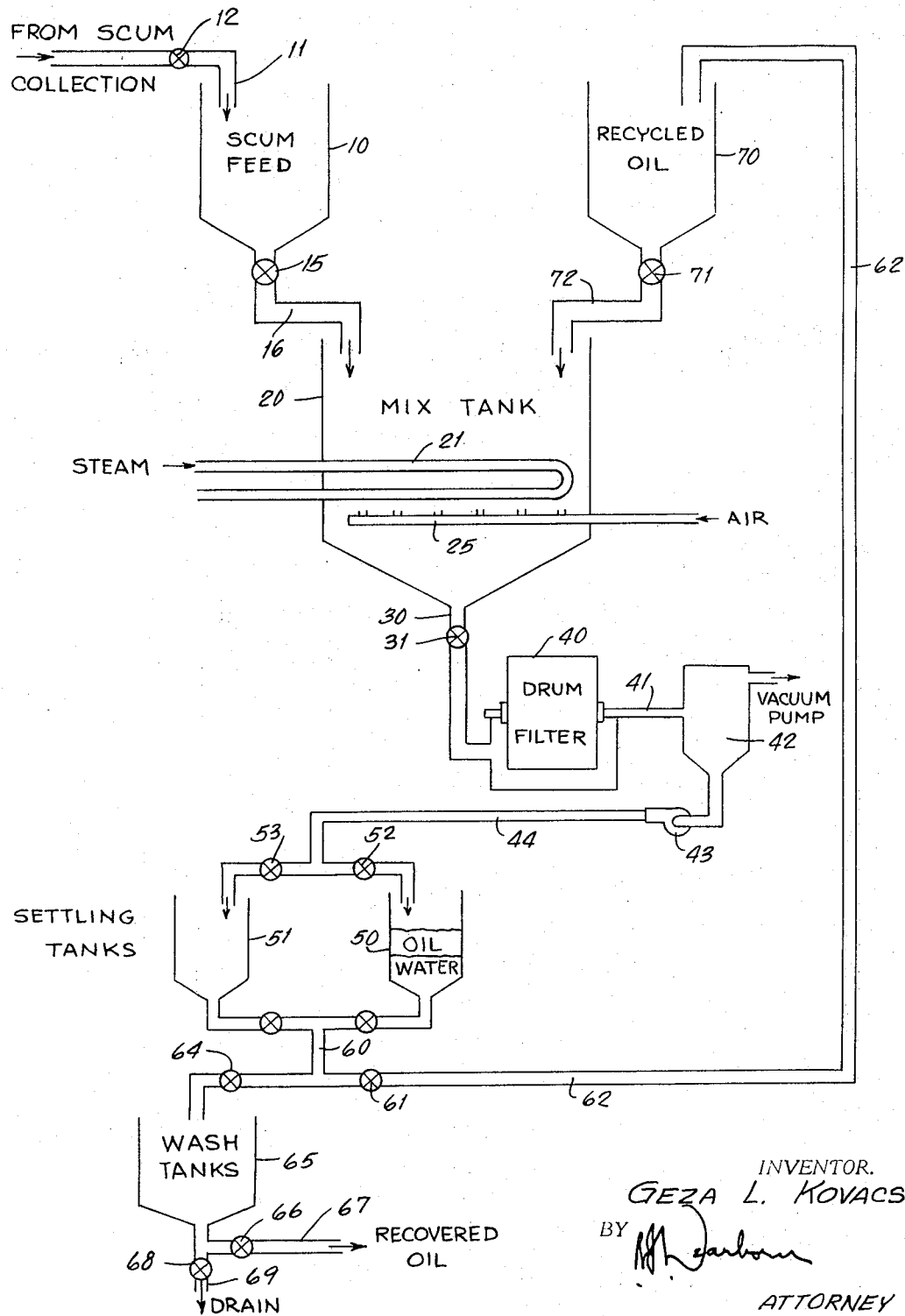

3,352,137
PROCESS FOR TREATING AND
RECOVERING ROLLING OIL
Geza L. Kovacs, New York, N.Y., assignor to Palm Oil
Recovery, Inc., Baltimore, Md., a corporation of Maryland
Filed Aug. 6, 1965, Ser. No. 477,699
3 Claims. (Cl. 72—42)

ABSTRACT OF THE DISCLOSURE

Iron particles are removed and the oil-water scum emulsion is broken by diluting the scum with recovered oil and filtering the diluted scum at an elevated temperature to remove the iron particles and thereafter permitting the filtrate to settle into a recovered oil layer and a water layer.

---

This invention relates to processes for the recovery and purification of rolling oils which have been used in the production of steel strips by cold rolling.

In the production of cold rolled steel, it is usual to employ one of two methods, as follows:

(1) A mixture of fatty oil and water in the ratio of 1 to 2 or 1 to 3 or 1 to 4 is copiously sprayed on the rolls and on the steel strip, or in some cases only on the steel strip. In addition, large quantities of water are used primarily for cooling and are sprayed on both the rolls and the strip. The total liquid is collected and the oil may constitute only approximately $\frac{1}{20}$ of 1% in the total mixture.

(2) In a large tank a mixture of oil and water in the ratio of approximately 10% oil to 90% water is agitated in the tank, is sprayed onto the rolls and onto the steel strips and is collected and returned to the tank. Either periodically or continuously a part of this mixture in the tank is drawn off and goes to a sump.

In the cold rolling of steel strip, palm oil or other vegetable or animal oil is ordinarily used and is combined with a large quantity of water. It is not unusual to include in the oil mixture a percentage of mineral oil, and in some cases mineral oil is substituted for vegetable or animal oil.

The palm oil or the like is of value and is used in sufficient quantities to make it well worth while to recover the oil and purify it for future use.

One object of this invention is to provide a novel and economical process for treating rolling oil so that it is recovered, purified and rendered susceptible of satisfactory reuse as a rolling mill oil.

The fine iron particles which are found in the rolling oil mixture are removed and may be recovered and thereby made available as a valuable by-product. It is important that the iron be removed so that it cannot act as a cataylst in any undesirable reaction. In prior art processes the iron particles are destroyed by acid.

The process of this invention is briefly described as follows:

A mixture of an animal or vegetable fatty oil to which petroleum oil, surfactants or the like are added, is used when mixed with a large quantity of water as a spray and coolant and is applied liberally to the rolls and to the steel strip as it passes through the cold rolling steel mill. The action of the mill in reducing the thickness of the steel strip produces a fine iron powder in varying amounts: usually more than 5% by weight of the oil used in the spray. The iron powder, some of which is colloidal, tends to effect a stable emulsion of the rolling oil and part of the cooling water. This mixture is pumped to a settlement basin or tank where about 60% to 70% of the oil separates in the form of a black viscous, butterlike scum.

This scum contains approximately 30% to 50% water, 3% to 6% iron powder, and the balance rolling oil with minor amounts of lubricants, hydraulic fluids and the like which have leaked into the system from the mill.

In a well known process presently in use this scum is boiled in an open vessel with sulfuric acid. The acid consumes the iron powder liberating hydrogen. The removal of the iron powder breaks the emulsion thus freeing the oil and water which separates on settlement, and the oil is decanted. The oil is boiled again with acid to insure complete removal of the iron and soaps. It is then washed free of excess acid with water.

Difficulties have arisen with this process due to the presence of silicates in the scum. When the scum is boiled with acid, the silicates are converted from water soluble forms to insoluble gels, principally silica gel. This silica gel is dispersed throughout the oil-water mixture and forms a permanent emulsion containing oil, water and acid.

In accordance with this present invention, the primary emulsion is broken without the use of acid which, as above explained, fixes the emulsion by forming silica gel. According to this invention the fresh scums are boiled with reclaimed oil, the reclaimed rolling oil being used in about the proportion of 1 to 2 of the fresh scum, and when this boiling is employed, the thick viscous material of the fresh scum is changed to a thin mixture which can readily be filtered. A continuous vacuum filter of the belt or precoat type may be satisfactorily employed with the result that the iron is removed and the filtered oil and water mixture is then allowed to settle, and the oil decanted and washed with water. This wash removes the silicates which are still water soluble, not having been contacted with acid.

After removal of the silicates, the oil may be acid washed with a small percentage of acid for the purpose of removal of soaps, as is common in the treatment of fats such as tallow for example.

The following specific examples will assist in the understanding of the process of this invention:

Example 1

300 gallons of fresh black scum containing 54% oil, 42.5% water and 3.5% iron were mixed with 150 gallons of light reddish brown colored oil from a previous run. The mixture was heated with steam coils and agitated with an air sparger for about 1 hour. The temperature of the resulting mixture was 190° F. It was then a uniform black colored oily fluid of much lower viscosity than scum alone at the same temperature. Two percent (2%) of a perlite filteraid was added to the mixture. The fluidity of the mass increased further though it was not as fluid as clean oil alone under similar conditions.

The filtration aparatus used was a Komline-Sanderson rotary vacuum filter of the precoat type. It was precoated with a hot oil slurry of a perlite filteraid, at 195° F. to a thickness of 1¾ inches under a vacuum of 11 inches of mercury.

The hot scum-oil mixture was then filtered through this apparatus at an average rate of 60 gallons per hour under an operating vacuum of 13 inches of mercury. The average rate of precoat removal by the cutting blade was ⅜ inch per hour.

A one litre sample of the filtrate was investigated in the laboratory. The reddish brown filtrate was a mechanical emulsion of oil and water which settled readily in 10 to 15 minutes into 700 ml. of oil and 300 ml. of water at 160° F. The murky water layer was discarded. The oil layer was washed twice with clear water at 180° F. and the slightly cloudy wash water discarded. The clean light reddish brown colored oil was then boiled with 100 ml. of a 5% strong solution of sulfuric acid for about 15 minutes. The resulting oil was a sparkling clean, light yellowish brown color and broke cleanly from the acid solution in a few seconds. The oil was water washed free of all traces of mineral acid. The color change in the light acid wash was believed to be due to removal of small amounts of iron soaps.

*Example 2*

225 gallons of fresh black scum containing 61% oil, 34.8% water and 4.2% iron were mixed with 225 gallons of light colored oil from a previous run. The mixture was heated with steam coils and agitated with an air sparger for 1½ hours. The temperature of the resulting mixture was 210° F. It was then a uniform, black colored, oily fluid of much lower viscosity than scum alone at the same temperature. No filteraid was added to the mixture.

The filtration apparatus used was the same as in Example 1. It was precoated with a hot oil slurry of Celite #545 filteraid at 190° F. to a thickness of 1¾ inches under a vacuum of 10 inches of mercury maximum.

The hot scum-oil mixture was then filtered through this apparatus at an average rate of 140 gallons per hour. In addition, a hot oil wash of 25 gallons per hour was applied on the cake at the top of the drum, throughout the run. The average rate of precoat removal by the cutting blade was ½ inch per hour.

A one litre sample of the filtrate was investigated in the laboratory. The reddish brown filtrate settled readily into 850 ml. of oil and 150 ml. of water. This oil layer was water washer, acid washed and water washed again as in Example 1. The resulting oil was a sparkling clean, light yellowish brown color.

*Example 3*

270 gallons of fresh black scum containing 55% oil, 41.8% water and 3.2% iron were mixed with 180 gallons of light colored oil from a previous run. The mixture was heated with steam coils and agitated with an air sparger for 1 hour. The temperature of the resulting mixture was 209° F. It was then a uniform, black colored, oily fluid of much lower viscosity than scum alone at the same temperature. Two percent (2%) of a perlite filteraid was added to the mixture. The fluidity of the mixture increased further, though it was not as fluid as clean oil alone under similar conditions.

The filtration apparatus used was the same as in Example 1. It was precoated with a hot oil slurry of Celite #545 filteraid at 190° F. to a thickness of 1¾ inches under a vacuum of 10 inches of mercury maximum.

The hot scum-oil mixture was then filtered through this apparatus at an average rate of 66 gallons per hour. In addition, a hot oil wash of 25 gallons per hour was applied on the cake at the top of the drum, throughout the run. The average rate of precoat removal by the cutting blade was 3/16 inch per hour.

A one litre sample of the filtrate was investigated in the laboratory. The reddish brown filtrate settled readily at 160° F. into 780 ml. of oil and 220 ml. of water. The oil layer was water washed, acid washed and water washed again as in Example 1. The resulting oil was a sparkling clean, light yellowish brown color.

The process of this invention will be more clearly understood by reference to the single figure of the accompanying drawing, which is a diagrammatic representation indicating equipment which may be employed in carrying out the steps of the process.

Referring to the drawing, a tank 10 receives scum from pipe 11 which has a control valve 12. A control valve 15 is located in the outlet pipe 16 which discharges into a mix tank 20. This tank has a steam heating coil 21 and also has an air discharge pipe 25.

An outlet pipe 30 having a control valve 31 leads from the bottom of the mix tank and discharges into drum filter 40. A filtrate from the filter flows through pipe 41 to tank 42 which is maintained under vacuum. The filtrate is drawn through pump 43 and pipe 44 and is discharged into settling tanks 50 and 51 through control valves 52 and 53. Oil from the settling tanks may be drawn through pipe 60, and a portion of it through valve 61 and pipe 62 is carried into a recycled oil tank 70 from which it is withdrawn through valve 71 and is discharged into the mix tank 20 through pipe 72.

The remainder of the oil from pipe 60 flows through pipe 63 and through control valve 64 and is discharged into wash tank 65. The recovered oil from the wash tank is drawn through control valve 66 and is discharged through pipe 67. The water is drawn through control valve 68 and pipe 69 to the drain.

The scum from feed tank 10 has such a high viscosity that it cannot be economically filtered even at an elevated temperature, but when it is mixed with the recycled oil which is drawn from tank 70 through control valve 71 and pipe 72, and when the mixture is heated by the steam coil 21 and air is admitted through the discharge pipe 25, the result is a low viscosity oil mixture which can readily be filtered in the drum filter 40. This separates the iron particles from the oil mixture, breaks the emulsion and produces a filtrate which is a mixture of oil and water. This mixture can readily be separated by settling in tanks 50 and 51.

At this stage the oil is suitable for recycling to the tank 70, and the remainder of the oil is subjected to a finishing treatment, which consists of a water wash followed by a weak acid treatment and a final wash with water, to provide a clean, high-grade oil. If desired, the oil so treated may be subjected to additional standard fat refining processes.

The description, drawings and examples have been included as illustrative of my invention, and only such limitations should be imposed as are indicated in the appended claims.

I claim:

1. The process of recovering fatty oil from the iron particle contaminated oil-water emulsion scum derived from the effluent from a cold rolling steel mill which process comprises:
    (1) diluting said scum to reduce its viscosity;
    (2) filtering at an elevated temperature the diluted scum to remove iron particles therefrom;
    (3) allowing the filtrate to separate into a fatty oil layer and a water layer;
    (4) separating said oil layer; and
    (5) cycling the desired amount of said separated oil to step (1) as said diluent.

2. The process of claim 1 wherein the recycle oil to scum proportion in step (1) is between about 1:2 and about 1:1

3. The process of claim 2 wherein said elevated temperature is between about 190° F. and about 210° F.

References Cited

UNITED STATES PATENTS

| | | | |
|---|---|---|---|
| 1,826,349 | 10/1931 | Harding et al. | 210—259 |
| 2,140,289 | 12/1938 | Hurtt et al. | 210—167 |
| 2,401,340 | 6/1946 | Dunmire et al. | 72—44 |
| 2,587,954 | 3/1952 | Babayan | 260—424 |
| 2,807,531 | 9/1957 | Kovacs | 75—.5 |
| 3,265,212 | 8/1966 | Bonsall | 210—257 |

CHARLES W. LANHAM, *Primary Examiner.*

E. M. COMBS, *Assistant Examiner.*